(No Model.) 2 Sheets—Sheet 1.
J. HOWARD & H. BAINES.
STOCK CAR.
No. 268,677. Patented Dec. 5, 1882.
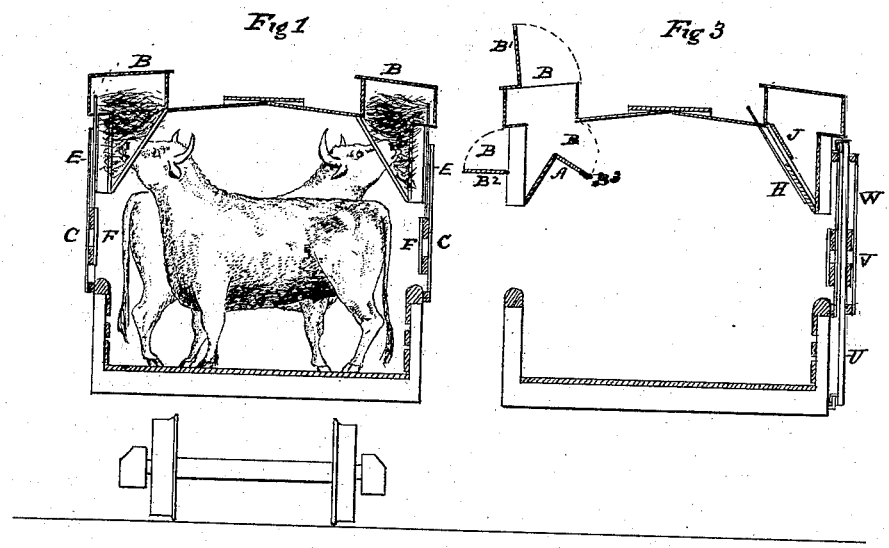
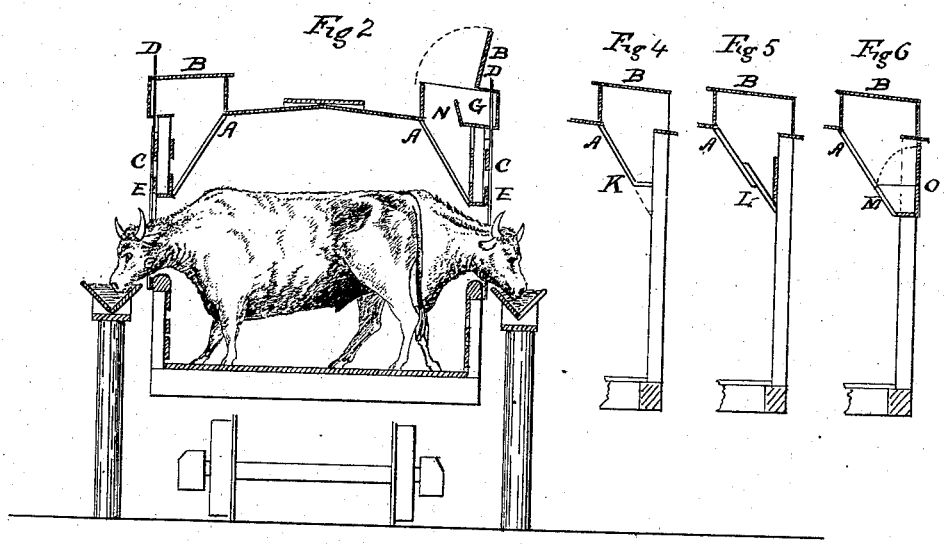
Witnesses
H. R. Howard
Wm. J. Howells
Inventors
Jas Howard
Hugh Baines (No Model.) 2 Sheets—Sheet 2.

J. HOWARD & H. BAINES.
STOCK CAR.

No. 268,677. Patented Dec. 5, 1882.

Witnesses
H. R. Howard.
Wm C. Howells

Inventors
Jas Howard
Hugh Baines

UNITED STATES PATENT OFFICE.

JAMES HOWARD AND HUGH BAINES, OF TORONTO, ONTARIO, CANADA.

STOCK-CAR.

SPECIFICATION forming part of Letters Patent No. 268,677, dated December 5, 1882.

Application filed November 7, 1882. (No model.)

*To all whom it may concern:*

Be it known that we, JAMES HOWARD and HUGH BAINES, British subjects, residing in Toronto, in the county of York, in the Dominion of Canada, have completed an invention of a new and useful Car for the Transportation of Live Stock, whereby the animals may be fed and watered in transit, of which the following is a specification.

Experimental trips have been made, arising out of a patent granted to James Howard, dated October 4, 1881; but at Chicago we, JAMES HOWARD and HUGH BAINES, became joint inventors, and then invented and have since built a car, as per specifiations and drawings hereunto annexed, and carried cattle therein.

The essential object of the present invention is to provide a stock-car wherein open racks for holding and feeding hay and other coarse food extend continuously along the length of the car across the inlet and exit doorways, at each side thereof, in such manner that the cars can be loaded promiscuously, and yet each head of cattle find food wherever it may be, and at the same time the car is not obstructed by partitions, so that free access is had to and from the car.

The invention has other objects, which will be explained in their order, the particular construction and arrangement of parts which constitute the invention being hereinafter explained in detail, and specifically set forth in the claims.

We will premise by stating that we are well aware that racks have been used in railway-cars almost ever since the introduction of railroads; but we have never seen or heard of a fire-proof rack extending the full length on one or both sides of the car and across the doorways, with adjustable slides for regulating the supply of food and giving the facility of loading promiscuously; nor have we seen or heard of any other racks that extend the full length of the car on one or both sides and across the doorways, being closed on the outside and open on the inside of the car, allowing cattle to get food at will.

We now more particularly describe our invention, reference being had to the accompanying drawings.

Figure 7:
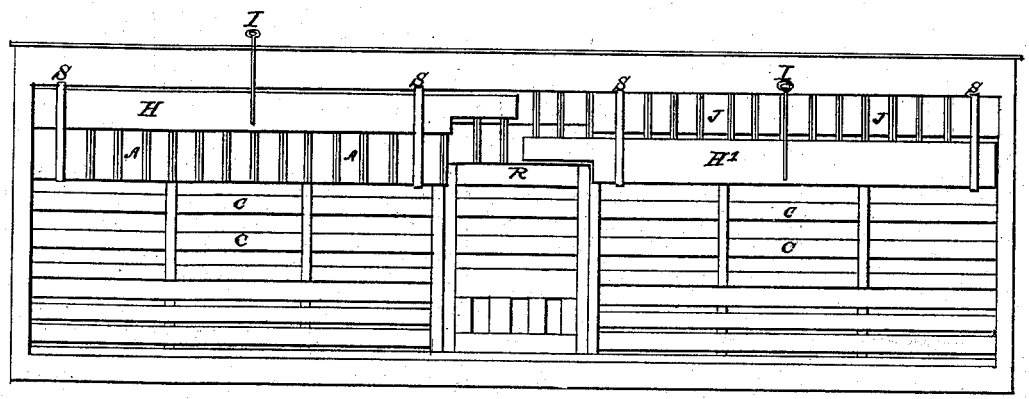
Figure 8:
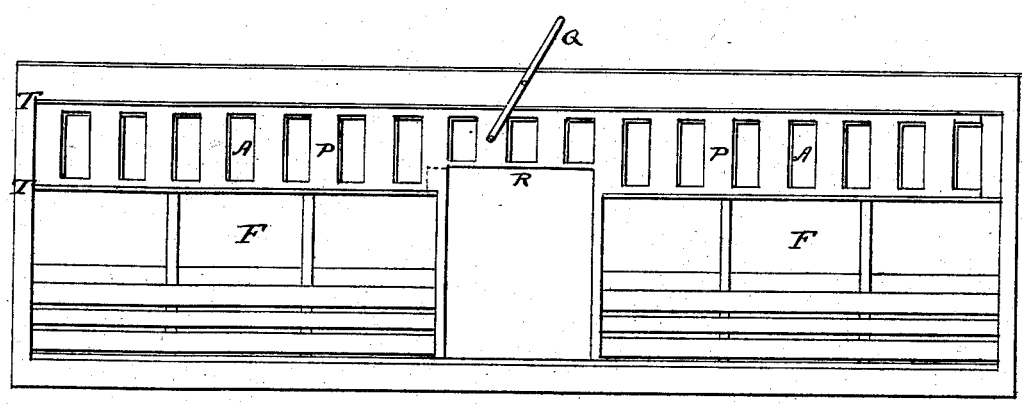

Figure 1, Sheet 1, is a transverse section of the car, showing the hay-rack and movable slats and how the cattle may feed. Fig. 2, Sheet 1, is a transverse section of the car, showing the openings and how cattle may drink out of troughs that may be placed upon the track. Fig. 3, Sheet 1, is a transverse section, showing that hay may be put into the racks through doorways in different places, and also end section of vertical slide on rack and section of door with movable slats. Fig. 4, Sheet 1, is one section of the rack at doorway of the car. Figs. 5 and 6, Sheet 1, are other sections showing the same. Fig. 7, Sheet 2, is a longitudinal section of the car, showing the interior arrangement of the hay-rack. The movable slats are shown in position closed. Fig. 8, Sheet 2, is a longitudinal section of the car, showing another arrangement of the same and movable slats open.

In Fig. 1, Sheet 1, A A are the open racks, which extend continuously from end to end of the car across the inlet and exit doorways in the sides thereof, such racks being made of some suitable fire-proof material, or covered and protected by a fire-proof material, such as asbestus or other substance. B B are some of the doors through which food may be placed in the racks. C C are the movable slats. D D are lifting and lowering rods attached to these movable slats. E E are the guides in which these movable slats work freely. F F are the openings, shown with the movable slats in position covering them. In Fig. 2. Sheet 1, the openings are shown with the movable slats C drawn up. G is a partition in the rack, whereby, if necessary, a division is made in the food, and a free space, N, is secured, through which the drover can get a sight of the cattle from the roof of the car.

Fig. 3, Sheet 1, B B B are doorways through which food may be placed in the racks, though we do not bind ourselves to their exact location or number. B' B² B³ are doors which can be closed, when so required. H is the vertical slide on the face of the rack, which regulates the supply of food. I is the rod by which the slide is worked, and J is the permanent board fixed on the inside of the upper half of the rack. U is the door sliding in the ordinary way. V is the movable rails covering the opening in the door. These rails are raised and lowered by rod D and work in the guides W. Fig. 4, Sheet 1, shows one method of making the rack in doorways by inserting the permanent bottom at K. Fig. 5, Sheet 1, shows another method of accomplishing the same by means of the loose bottom L, which is made to telescope into the upper half, A. Fig. 6, Sheet 1, shows a third method of doing the same by means of the box-bottom M, which is hinged at O, and is made to turn up in the direction of the dotted line.

Fig. 7, Sheet 2, H H are the vertical slides on the face of the rack. I I are the rods for working the same. J J show the permanent board covering the upper half of the rack. S S are the guides in which the adjustable slide works. C C C C are the movable slats in position covering the openings. Fig. 8, Sheet 2, shows another arrangement for regulating the supply of food by means of a horizontally-sliding board, P P, having alternate spaces and solid parts corresponding with spaces in the racks, and is moved by the lever Q horizontally, so that the solid part may cover the open spaces in the racks more or less, and thereby regulate the supply of food. T T are grooves in which the horizontally-sliding board works. F F are the openings for the cattles' heads, the movable slats being raised. These racks we make the full length of the car, or in sections not necessarily abutting against each other, and we attach them to any suitable part of the car. We prefer the upper part on one or both sides and across the doorways, as shown. Where cars are sufficiently high to admit of the racks being placed inside, we then make the permanent boards J J wider, so that openings and doors may be placed thereon, if necessary, and also give sufficient room for food, and in this case the upper part of the racks does not project through the roof, as shown in the drawings. At Figs. 4, 5, and 6, Sheet 1, we show different sections of racks as placed in the doorways of the car. Fig. 4 at A and K shows the racks shortened, as at R R, Figs. 7 and 8, Sheet 2. Fig. 5 at L shows the rack the full depth, having the lower part at L telescoping inside the upper part at A, so that by lifting and hooking this up a larger entrance is given for cattle to get into the car, and when loaded this part at L is again lowered. Fig. 6 at O shows another way of accomplishing the same object. The lower part of the rack, being hinged at O and open toward M, passes up in the direction of the dotted line, and is then held until the cattle are loaded, when it is allowed to return to its original position. Fig. 2, Sheet 1, at G the rack is shown divided, and when in use hay is first put into that part at G, and when cattle require to be fed the food is raised and dropped to the lower part of the rack. However, the food is never allowed to be very high in the rack, so that by raising the door B a sight can be had at A through the spaces in the racks at the cattle in the car.

Fig. 1, Sheet 1, C C are the lifting-slats shown in position, and C C, Fig. 2, Sheet 1, show the same raised and the cattle shown in position for drinking from troughs to be placed on each side of the track. F F are the openings.

When cattle are to be carried and fed in cars it is better first to close the slides H H and P P. (Shown in Figs. 7 and 8, Sheet 2.) The hay or other food is then placed in through the openings B B B, Fig. 3, Sheet 1, and when the rack is required to be made fire-proof doors B' B² B³ are closed. When cattle are to be fed the horizontal slide H, Fig. 7, Sheet 2, is raised by means of rod I and the food exposed at A A. Rod I has on itself notches at intervals, so that the quantity of food exposed to the cattle may be regulated or entirely cut off, as shown at H'. Fig. 8, Sheet 2, shows another method of accomplishing the same object. A A were some of the spaces. P P form part of the horizontal slide for covering the same; Q, a lever attached to P P, so that when it is moved by its upper end the horizontal slide P P is made to cover the spaces A A to a greater or smaller degree or close them altogether.

In cases where a fire-proof rack is not considered of advantage we omit the slide H H and allow one or more of the openings B' B² B³, Fig. 3, Sheet 1, to remain uncovered for the purpose of putting in hay. By this method cattle are not regulated in their supply of food, but allowed to eat until their supply has been exhausted.

In Figs. 1 and 2, Sheet 1, D D are rods attached at one end to the sliding slats, and at or near the center having on them a hook, and on the upper end a handle, so that by taking hold of the handle the slats may be raised sufficiently and the rod secured. When the slides are to be returned to their places the rod is released and the slides lowered to their former position.

Having thus described our invention, what we claim as new, and desire to obtain Letters Patent for, is—

1. A stock-car provided interiorly with a fire-proof rack for holding and feeding hay and other coarse food, said rack extending longitudinally along the entire length of the car, substantially as described.

2. The combination, with a stock-car having inlet and exit doorways in its sides, of a fire-proof rack for holding hay and other coarse food, and extending longitudinally along the car across the doorway-openings, substantially as described.

3. The combination, with a stock-car having in its sides doorways through which the cattle pass in loading and unloading the car, of the open stationary racks extending longitudinally along the car, on both sides thereof, and continuously from end to end across the said inlet and exit doorways, said rack being constructed at the doorways, as shown, to provide the requisite enlargement at that point to permit the cattle to freely pass under the rack.

4. In a stock-car, the combination, with a rack for holding and feeding hay and other coarse food, and extending longitudinally along the car, of mechanism, such substantially as described, for covering and uncovering portions of the rack to expose more or less of the food held by the rack.

5. In a stock-car, the combination, with a rack for holding and feeding hay and other coarse food, and extending longitudinally along the car, of the longitudinal slide arranged to be adjusted for exposing more or less of the food held by the rack, substantially as described.

6. In a stock-car, the combination, with a rack for holding and feeding hay and other coarse food, of a longitudinal slide arranged to cover and uncover portions of the rack to expose more or less of the food held thereby, and a rod or chain extending to the roof of the car for adjusting the slide, substantially as described.

7. The combination, with a stock-car, of a rack for holding and feeding hay and other coarse food, and extending longitudinally along the car, a partition dividing the rack to divide the food and create a free space, N, and an opening and closing door by which the cattle can be inspected from the roof of the car through the said free space and the rack, substantially as described.

8. In a stock-car, the combination, with a rack for holding and feeding hay and other coarse food, and extending longitudinally along the car, across the inlet and exit doorways in the sides thereof, of a movable bottom for the rack located at the doorways and capable of adjustment to enlarge the door-opening, substantially as described.

JAS. HOWARD.
HUGH BAINES.

Witnesses:
H. R. HOWARD,
WM. C. HOWELLS.